INVENTOR.
THOMAS B. MARTIN
BY John T. O'Halloran
Attorney

July 23, 1968  T. B. MARTIN  3,394,351
LOGIC CIRCUITS
Filed June 29, 1965  6 Sheets-Sheet 2

INVENTOR.
THOMAS B. MARTIN
BY John T. O'Halloran
Attorney

July 23, 1968 T. B. MARTIN 3,394,351
LOGIC CIRCUITS

Filed June 29, 1965 6 Sheets-Sheet 3

INVENTOR:
THOMAS B. MARTIN
BY John T. O'Halloran
Attorney

July 23, 1968  T. B. MARTIN  3,394,351
LOGIC CIRCUITS

Filed June 29, 1965  6 Sheets-Sheet 4

INVENTOR.
THOMAS B. MARTIN
BY John T. O'Halloran
Attorney

INVENTOR.
THOMAS B. MARTIN
BY John T. O'Halloran
ATTORNEY

July 23, 1968   T. B. MARTIN   3,394,351
LOGIC CIRCUITS

Filed June 29, 1965   6 Sheets-Sheet 6

INVENTOR.
THOMAS B. MARTIN
BY John T. O'Halloran
Attorney

United States Patent Office 3,394,351
Patented July 23, 1968

3,394,351
LOGIC CIRCUITS
Thomas B. Martin, Riverside, N.J., assignor to Radio Corporation of America, a corporation of Delaware
Filed June 29, 1965, Ser. No. 468,068
10 Claims. (Cl. 340—172.5)

ABSTRACT OF THE DISCLOSURE

A universal neuron circuit is provided that performs any one of a plurality of digital logic functions as well as analog functions. The universal neuron logic circuit includes a plurality of neurons, with each neuron having an input-output transfer characteristic exhibiting a substantially linear portion having a slope of a predetermined value. Weighting resistors related in value to the predetermined value of said slope, i.e. multiples or submultiples thereof, are utilized to interconnect the neuron circuits on two different levels, as well as to apply input signals to the neurons. A weighting resistor corresponding in value to a multiple of 1 of the value of said slope, i.e. equal in value to said slope, is termed a "unity gain resistor" and the application of an input signal to a neuron through such a resistor produces an output signal from the neuron that is exactly equal to the input signal. By utilizing weighting resistors having resistance values greater and lesser than a unity gain resistor, lesser and greater values of output signals are respectively obtained. Various combinations of such neuron circuits provide various digital and analog logic functions depending upon the values of the input signals.

---

This invention relates to logic circuits, and more particularly, relates to generalized logic circuits that perform either analog or digital logic functions or both by using electrical neurons.

Electrical neurons are circuits that exhibit properties analogous to biological neurons. Biological neurons are the basic building blocks of a nervous system and receive stimuli in the form of electrical input signals from other neurons or from receptor sense organs such as the eye, the ear, etc. Neurous receive two types of input signals, excitatory signals that tend to activate the neuron and inhibitory signals that tend to inhibit the activation of the neuron. Neurons are activated when the excitatory input signals exceed the inhibitory input signals by a predetermined threshold amount and the output of the neuron exhibits an abrupt step increase at the time the neuron is activated. Thus, neurons exhibit digital characteristics in having an abrupt transfer from an inactive state to an active state. Neurons also exhibit analog characteristics in that the output signal increases as the excitatory input signal increases above the threshold amount until a point is reached at which the neuron saturates, whereupon the output signal remains constant regardless of further increases in the excitatory input signals. Biological neurons also exhibit temporal characteristics in that the input signals need not be coincident but may occur consecutively and the desired effect in the neuron may still be produced. This is because the excitatory and inhibitory input signals are effectively integrated in the neuron to provide resultant signals that are stored temporarily for a period of time dependent upon the effective time constant of integration.

As a result of the combination of the analog, digital, and temporal characteristics of neurons, biological nervous systems are capable of processing a very large amount of information very rapidly. By simulating such characteristics electrical neurons also provide greater data processing capabilities than do digital or analog logic circuits.

Accordingly, it is an object of this invention to provide new and improved electrical neuron logic circuits.

It is another object of this invention to provide new and improved logic circuits that exhibit both analog and digital properties.

Logic circuits in accordance with the invention include an electrical neuron having an input-output transfer characteristic exhibiting a portion having a substantially linear slope of a predetermined value. A plurality of weighting resistors, each having a resistance value related to the predetermined value of said slope, are separately coupled to apply input signals to the electrical neuron. The electrical neuron produces an output signal exhibiting a gain of less than unity when an input signal is applied through a weighting resistor having a value greater than said slope; an output signal exhibiting a gain of greater than unity when an input signal is applied through a weighting resistor having a value less than said slope; and an output signal exhibiting a gain equal to unity when an input signal is applied through a weighting resistor equal to said slope. To perform the various digital and analog operations on the input signals, the logic circuits rely on the weighting resistors as well as the ability of electrical neurons (1) to subtract an input signal applied to an inhibitory input terminal from an input signal applied to an excitatory input terminal to provide a resultant difference signal (2) to add input signals applied to excitatory input terminals to provide a resultant sum signal, and (3) to add input signals applied to inhibitory input terminals when such signals are exceeded by excitatory input signals to provide a summed inhibitory signal that subtracts from the excitatory signals.

In the drawing:
FIGURES 4a through 13a are schematic block diagrams of neural logic circuits in accordance with the invention;
FIGURES 4b through 13b are graphs illustrating the input-output transfer characteristics of the corresponding logic circuits of FIGURES 3a through 13a;
FIGURES 14a through 16a are schematic block diagrams of other embodiments of neural logic circuits according to the invention;
FIGURES 14b through 16b are graphs illustrating the transfer functions of the corresponding logic circuits of FIGURES 14a through 16a; and,
FIGURES 17a and 17b are a schematic block diagram and a transfer function, respectively, of an embodiment of a neural logic network according to the invention.

There are four combinations of two binary input signals A and B (i.e., 00, 01, 10 and 11). For each of these four combinations of binary input signals, a digital logic gate can produce an output of either one of two values, i.e., 0 or 1. Therefore, with four possible binary input values and two possible binary output values for each of the four input values, there are sixteen different combinations of input and output values that are possible. The sixteen combinations and the logic functions for these combinations are listed in Table I.

TABLE I

| | (1) | (2) | (3) | (4) | (5) | (6) |
|---|---|---|---|---|---|---|
| | Input | | | | Boolean Equation Describing Logic Function | Name |
| | A B<br>0 0 | A B<br>0 1 | A B<br>1 0 | A B<br>1 1 | | |
| | Output | | | | | |
| (1) | 0 | 0 | 0 | 1 | $f_1 = AB$ | AND |
| (2) | 1 | 1 | 1 | 0 | $f_2 = \overline{AB}$ | NAND |
| (3) | 0 | 1 | 1 | 1 | $f_3 = A+B$ | OR |
| (4) | 1 | 0 | 0 | 0 | $f_4 = \overline{A+B}$ | NOR |
| (5) | 0 | 1 | 1 | 0 | $f_5 = A\overline{B}+\overline{A}B$ | EXCLUSIVE OR |
| (6) | 1 | 0 | 0 | 1 | $f_6 = \overline{A\overline{B}+\overline{A}B}$ | EXCLUSIVE NOR |
| (7) | 0 | 1 | 0 | 0 | $f_7 = \overline{A}B$ | |
| (8) | 0 | 0 | 1 | 0 | $f_8 = A\overline{B}$ | |
| (9) | 1 | 0 | 1 | 1 | $f_9 = \overline{B}+A$ | |
| (10) | 1 | 1 | 0 | 1 | $f_{10} = \overline{A}+B$ | |
| (11) | 0 | 0 | 1 | 1 | $f_{11} = A$ | |
| (12) | 0 | 1 | 0 | 1 | $f_{12} = B$ | |
| (13) | 1 | 1 | 0 | 0 | $f_{13} = \overline{A}$ | |
| (14) | 1 | 0 | 1 | 0 | $f_{14} = \overline{B}$ | |
| (15) | 0 | 0 | 0 | 0 | $f_{15} = 0$ | |
| (16) | 1 | 1 | 1 | 1 | $f_{16} = 1$ | |

In Table I the numbers at the head of Columns 1–4 indicate the binary values of the input signals A and B. The binary digits in the sixteen rows under Columns 1–4 indicate the value of the output signals for these inputs. Each of the sixteen rows comprises a separate gate and the Boolean equation describing the logic function performed by each gate is listed in Column 5. The name for each of those of the sixteen gates that have a recognized name in the art is listed in Column 6.

Figure 1:
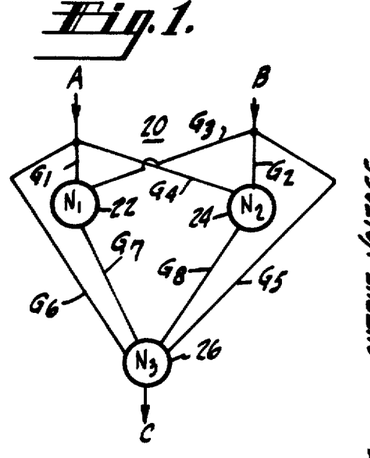
FIGURE 1 is a schemeatic block diagram of a general electrical neuron logic circuit.

A generalized electrical neuron circuit that performs any of the functions listed in Table I on a pair of input signals A and B is shown in FIGURE 1. The universal neuron circuit 20 includes a plurality of electrical neurons 22, 24, 26 arranged in first and second levels. Many different electrical neurons have been described in the literature and are acceptable for use in the circuit 20. However, a preferred embodimentl of an electrical neuron for practicing the invention is described in a copending application entitled, "Threshold Circuit," filed by T. B. Martin and E. P. McGrogan Oct. 27, 1964, Ser. No. 406,681, and assigned to the same assignee as the present invention. The disclosure of that copending application is herewith incorporated by reference into this application.

Figure 2:
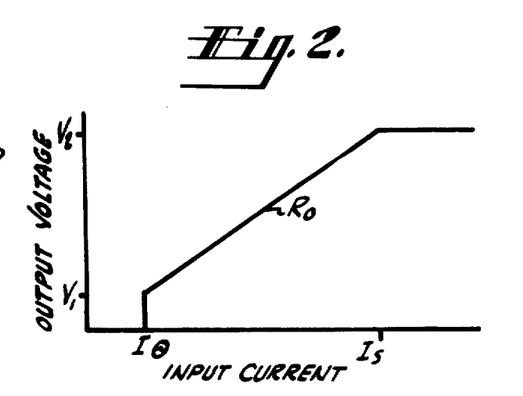
FIGURE 2 is a graph illustrating the input-output transfer function of the electrical neurons utilized in FIGURE 1.

The preferred electrical neuron is a direct current (DC) or "pulseless" type neuron that exhibits an input-output transfer characteristic as shown in FIGURE 2. When the excitatory input current exceeds the inhibitory input current by a predetermined threshold, $I_6$ in FIGURE 2, the voltage output of the electrical neuron jumps in an abrupt step from substantially zero to a predetermined value $V_1$. As the excitatory input current increases further, the output voltage rises substantially linearly until the neuron saturates at the input current values $I_s$. The output voltage thereupon remains substantially constant at the saturation value $V_2$ regardless of further increases in input current.

When operating the electrical neuron as a digital component, an output voltage of less than $V_1$ represents a binary 0, whereas an output voltage of $V_2$ represents a binary 1. When operating the electrical neuron as an analog element, the output voltage is limited to values between $V_1$ and $V_2$ which correspond to the monotonically increasing portion of the transfer characteristic.

Figure 3:
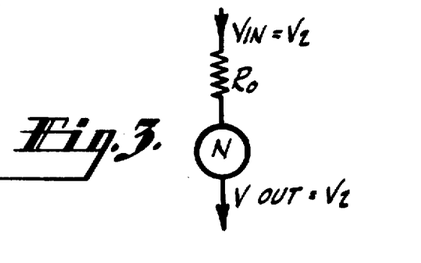
FIGURE 3 is a schematic circuit diagram of a neuron having an input signal applied thereto through a weighting resistor.

The slope of the monotonically increasing portion or analog portion of the transfer characteristic in FIGURE 2 is designated $R_0$ because this slope is effectively a transfer resistance. A resistor having a value equal to $R_0$ is termed a unity gain resistor. This name is selected because when such a resistor couples an input signal to an electrical neuron having the transfer characteristic of FIGURE 2, the attenuation of the input signal in the resistor $R_0$ is exactly counterbalanced by the amplification of the input signal in the electrical neuron so that the resultant output signal from the neuron exactly equals the input signal. Thus, the gain is exactly unity. As an illustration of this refer to the circuit of FIGURE 3. In this circuit an input signal $V_2$ equal to the saturation voltage $V_2$ in FIGURE 2 is applied to the series combination of a unity gain resistor $R_0$ and neuron N. The input resistance of the neuron N is in practice so much less than $R_0$ that it can be neglected. Therefore, the input current is $I_s$, the same value of current as $I_s$ in FIGURE 3, because this graph is also effectively the input characteristic of a neuron when combined with a series unity gain resistor $R_0$. With an input current of $I_s$, the output voltage of the neuron is $V_2$, which is the same as the input voltage. Thus, a unity gain resistor $R_0$ is a weighting resistor that provides exactly unity gain. A weighting resistor less than $R_0$ produces an output voltage greater than the value of the input voltage in a substantially linear but inverse correspondence. For example, a weighting resistor equal to $R_0/2$ provides an output voltage twice the value of the input voltage. Conversely, a weighting resistor greater than $R_0$ provides an output voltage equivalently less than the input voltage. For example, a weighting resistor equal to $2R_0$ produces an output voltage half that of the input voltage.

It is to be noted that when excitatory and inhibitory input signals are applied through unity gain weighting resistors to an electrical neuron, the neuron linearly subtracts the inhibitory signals from the exictatory signal to produce a difference signal. Of course, no output is produced if the excitatory signals do not exceed the inhibitory signals by the threshold amount. When a pair of input signals are applied through unity gain resistors to a pair of excitatory input terminals, the signals are added together to produce a sum output signal. When the input signals are applied through unity gain resistors to a pair of inhibitory input terminals, the input signals are added together to reduce any output signal by the sum of the two inhibitory signals.

Referring back to FIGURE 1, the input signal A is applied to the nuerons 22, 24 and 26 through weighted connecting resistors, not shown, such that the component output signals resulting therefrom are $G_1A$, $G_4A$ and $G_6A$, respectively. The gains $G_1$, etc., may be greater or less than unity. If a gain equals zero, then no connection of the input signal is deemed to be made to the applicable neuron. The input signal B is coupled through weighted connecting resistors, not shown, to the neurons 22, 24 and 26 such that the component output signals resulting therefrom are $G_2B$, $G_3B$ and $G_5B$, respectively. The resultant output signals from the first level neurons 22 and 24 are coupled through weighted connecting resistors, not shown, to the second level neuron 26 such that the component output signals resulting therefrom are $G_7(G_1A+G_3B)$ and $G_8(G_4A+G_2B)$, respectively. The output signal C from the universal neuron gate 20 is expressed in an ordinary algebraic equation as $$C = [G_6A + G_5B + G_7(G_1A + G_3B) \\ + G_8(G_2B + G_4A)] \quad (1)$$

For convenience, the signs in Equation (1) have been made plus (+). However, these signs may be either plus (+) or minus (−) depending upon whether the connections are made to an excitatory input terminal or an inhibitory input terminal, respectively.

Figure 4A:
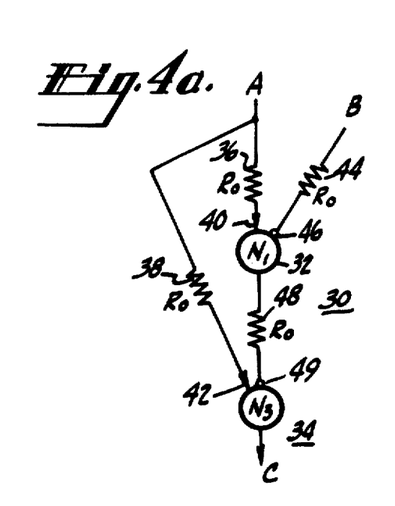

Referring now to FIGURE 4a, a neural logic circuit 30 which performs the binary function AND in accordance with the Boolean equation in Row 1, Column 5, of Table I is illustrated. The AND gate 30 includes a first level neuron 32 and a second level neuron 34. An input signal A is applied through a pair of unity gain resistors ($R_0$) 36 and 38 to excitatory input terminals 40 and 42 of the neurons 32 and 34, respectively. Throughout the drawing an excitatory input terminal of a neuron is represented by an arrowhead. An input signal B is applied through a unity gain resistor ($R_o$) 44 to an inhibitory input terminal 46 of the neuron 32. Throughout the drawing an inhibitory input terminal of a neuron is represented by a circle. The output terminal of the neuron 32 is coupled through a unity gain resistor 48 to an inhibitory input terminal 49 of the second level neuron 34. The output signal C of the neuron 34 is described by the algebraic equation $$C = [A - (A - B)] \qquad (2)$$

The Equation (2) is a reduced version of the Equation (1) because $G_2$, $G_4$, $G_5$ and $G_8$ equal zero and $G_1$, $G_3$, $G_6$ and $G_7$ equal one in the circuit of FIGURE 4a, $G_1$, etc., equals one because unity gain resistors $R_o$ are utilized as the weighted connecting elements in the gate 30. The minus sign in the equation indicates that the applicable signal is applied to an inhibitory input terminal of a neuron. Thus, $(A-B)$ is the resultant output signal of the neuron 32 with the B input signal being applied to the inhibitory input terminal 46 of the neuron 32 and the A input signal being applied to the excitatory input terminal 40 of the neuron 32.

In digital operation, the values of the input signals A and B to the neural gate 30 are limited to either 0 or 1 and hence the output signal C is either a 0 or 1. The output signal C equals a binary 1 when and only when both the input signals A and B are binary 1. Algebraically, this result is apparent from Equation (2) because under these input conditions the term $(A-B)$ becomes zero and C is then equal to A which is 1. Physically, this is apparent from FIGURE 4a wherein the inhibitory input signal B effectively cancels the excitatory input signal A to produce no output signal from the neuron 32. Consequently, no inhibitory input signal is applied to the second level neuron 34 and the direct application of the input signal A of the binary 1 level or voltage $V_2$ through the unity gain resistor 38 produces a binary 1 output from the second level neuron 34.

Figure 4B:
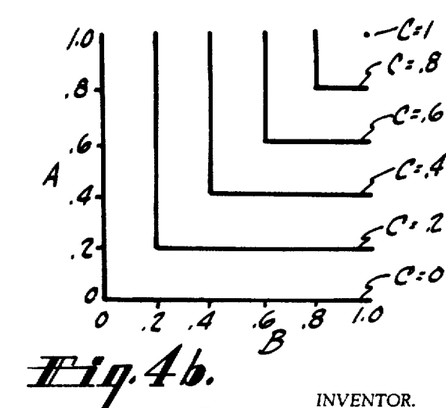

When analog signals between the limits of the voltages $V_1$ and $V_2$ in FIGURE 2 are applied to the neural gate 30, the gate 30 functions as an indicator of which is the lesser or minimum signal. The transfer characteristic of the gate 30 which is shown in FIGURE 4b, illustrates this operation. In FIGURE 4b, as well as in the remaining transfer characteristics described later, the input signals A and B and the output signal C are shown normalized. When normalized the voltage $V_2$ is 1, whereas equal portions from 0 volts to $V_2$ are designated .2, .4, .6 and .8, respectively in the transfer functions. Such a designation recognizes that the voltage $V_1$ shown in FIGURE 2 is a small portion of the voltage $V_2$ and can be effectively ignored so long as the minimum input signal is larger than $V_1$.

Assume that a normalized input signal A equal to .4 is applied through resistor 36 to the excitatory input terminal 40 of the neuron 32 and a normalized input signal B equal to .6 is applied through the resistor 44 to the inhibitory input terminal 46 of the same neuron. Equation (2) states that under these conditions the output signal C is .4. To arrive at this value it is important to remember that there can be no resulting negative number because this would denote that an inhibitory input signal can produce an output. Since this is impossible physically, all resulting negative numbers must be changed to zero.

Physically, the input signal B provides a greater inhibitory signal input to the neuron 32 than the signal A provides an excitatory input thereto. Consequently, the neuron 32 produces no output and the signal A is the only input to the second level neuron 34. Since the input signal A is applied through a unity gain resistor 38 and is an excitatory input, the neuron 34 produces an output signal equal to the input signal A. Thus, with anolog input signals, the gate 30 provides an output equal to the lesser of the two input signals. With binary input signals the logic circuit 30 produces an AND function.

Figure 5A:
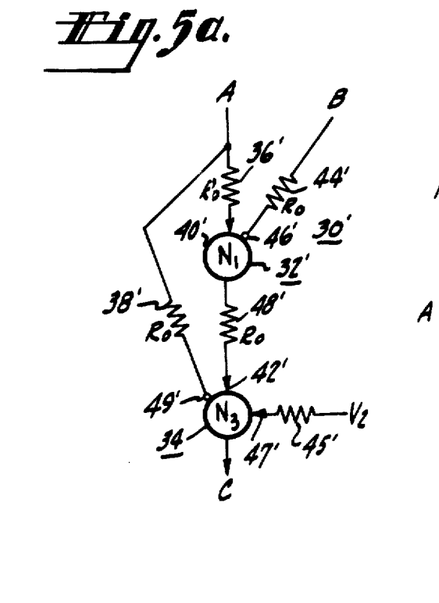
Figure 5B:
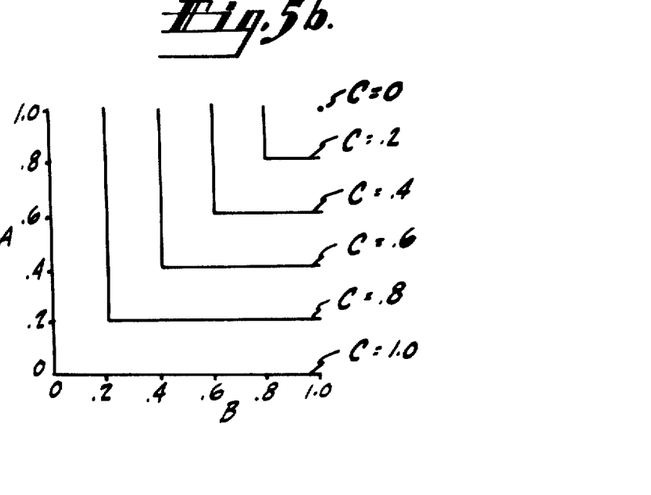

In FIGURE 5a there is illustrated a neural logic circuit 30' which provides the Boolean logic function known as the NAND function and shown in Row 2 of Table I. The circuit 30' utilizes the same components as the AND circuit 30 of FIGURE 4a and consequently these components have been given the same reference numerals but the numerals are primed. The differences between the neural circuits 30 and 30' is that in the neural circuit 30' the input signal A is applied to the inhibitory input terminal 49' of the neuron 34' whereas the resultant signal from the first level neuron 32' is applied to the excitatory input terminal 42' of the second level neuron 34'. These connections are the opposite of those in the neural circuit 30. Additionally, the second level neuron 34' is also biased to conduct in saturation by a bias signal $V_2$ applied through a unity gain resistor 45' to a second excitatory input terminal 47' thereof. The transfer characteristic of the neural circuit 30' is shown in FIGURE 5b and this circuit produces an output C in accordance with the equation $$C = [1 - A + (A - B)] \qquad (3)$$

When the input signals A and B are of binary levels, the neural logic circuit 30' performs the NAND logic function. The output signal C will remain a binary 1 until both the input signals A and B are binary 1 level signals. In analog operation, it is again assumed that the input signal A has a normalized value of .4 whereas the input signal B has a normalized value of .6. In accordance with the Equation (3), C equals .6 under these conditions. Physically, the neuron 32' produces no output because the inhibitory input signal B exceeds the excitatory input signal A. The second level neuron 34' is biased to conduct normally at saturation by the biasing signal $V_2$. The inhibitory input signal A of normalized value .4$V_2$ subtracts from this biasing signal to produce an output signal of .6$V_2$.

Figure 6A:
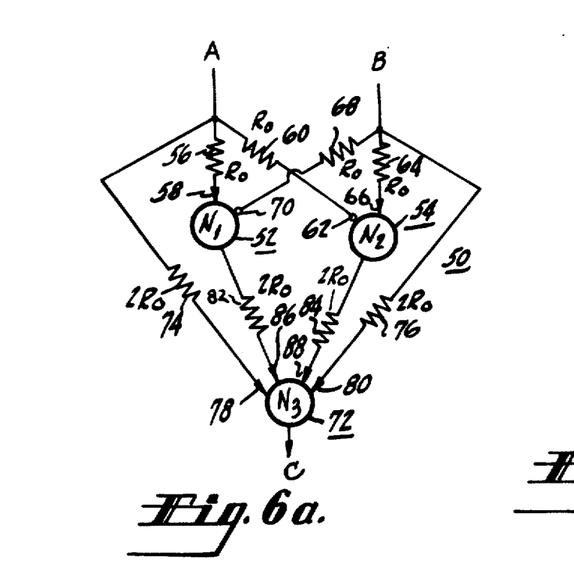

Referring now to FIGURE 6a, a neural logic circuit that performs the OR function for binary input signals as listed in Row 3 of Table I is illustrated. The logic circuit 50 includes first level neurons 52 and 54. An input signal A is applied through a unity gain resistor ($R_o$) 56 to an excitatory input terminal 58 of the first level neuron 52 and through a unity gain resistor ($R_o$) 60 to an inhibitory input terminal 62 of the first level neuron 54. Similarly, the second input signal B is applied through a unity gain resistor ($R_o$) 64 to the excitatory input terminal 66 of the neuron 54 and through a unity gain resistor ($R_o$) 68 to an inhibitory input terminal 70 of the neuron 52. The logic circuit 50 also includes a second level neuron 72. Input signals A and B are applied through resistors 74 and 76 to excitatory input terminals 78 and 80, respectively, of the neuron 72. The resistors 74 and 76 have a value $2R_o$ (double the unity gain resistance value) to halve the effect of the signals A and B on the second level neuron 72. The output terminals of the neurons 52 and 54, respectively, are coupled through resistors 82 and 84, respectively, to excitatory input terminals 86 and 88 of the neuron 72. The resistors 82 and 84 are also $2R_o$ and consequently halve the effect of the resultant signals from the first level neurons 52 and 54 on the second level neuron 72. The output C of the logic circuit 50 is described by the algebra equation $$C = [\tfrac{1}{2}A + \tfrac{1}{2}B + \tfrac{1}{2}(A-B) + \tfrac{1}{2}(B-A)] \qquad (4)$$

Figure 6B:
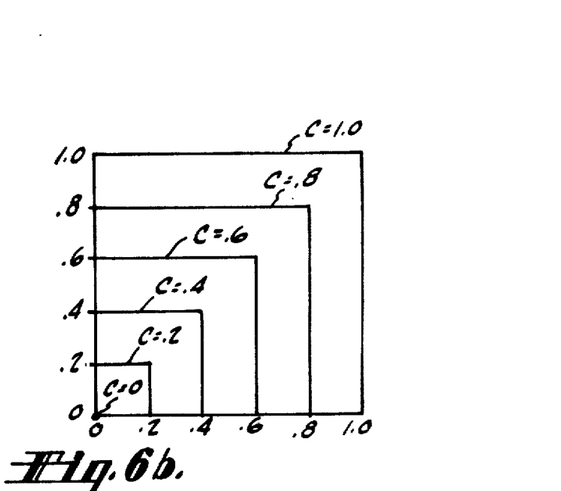

The transfer function of the neural circuit 50 is shown in FIGURE 6b.

When the input signals A and B are binary signals, the logic circuit 50 performs an OR function. When the signals A and B are analog signals, the logic circuit 50 provides an indication of which of the two signals is the greater or maximum. For example, assume that input signal A equals a normalized value of .8 whereas the input signal B equals the normalized value of .2. As shown by the transfer function in FIGURE 6b, such input signals produce an output from the neuron circuit 50 of .8. Physically, the output of the neuron 54 is 0 inasmuch as the inhibitory signal A applied to the neuron 54 is greater than the excitatory signal B applied thereto. All of the signals applied to the second level neuron 72 are excitatoy signals. Since these signals are applied through weighting resistors of twice the value of a unity gain resistor, the signals are halved. Thus, one-half the A input signal or .4, one-half the B signal or .1, and one-half of the resultant signal from the neuron 52 which is .3 are summed in the second level neuron 72 to produce an output signal C equal to .8. This value is equal to the maximum of the two input signals. Thus, the logic circuit 50 is a maximum signal indicator for analog input signals.

Figure 7A:
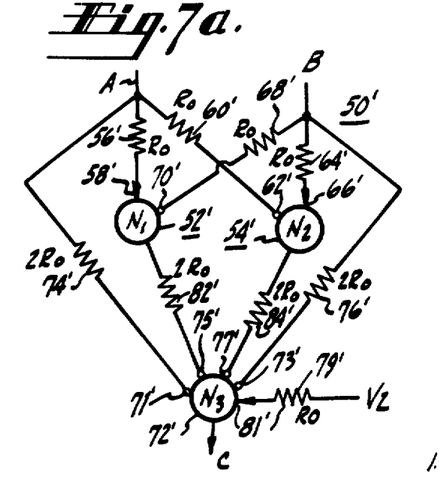
Figure 7B:
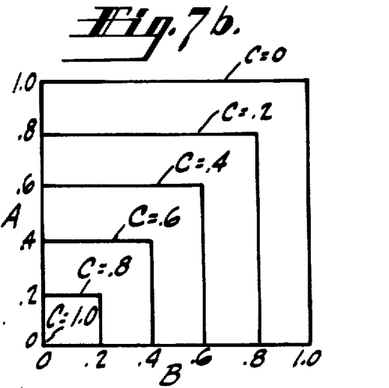

Referring now to FIGURE 7a, there is shown a neural logic circuit 50' that performs the NOR function as shown in Row 4 of Table I, when two binary input signals are applied thereto. The components in the circuit 50' are given the same, but primed, reference numerals as the components in the circuit 50 because the two circuits are similar. One difference between the circuits 50 and 50' is that the A and B input signals are applied, respectively, to inhibitory input terminals 71' and 73' of the second level neuron 72' whereas the resultant signals from the first level neurons 52' and 54' are also applied to inhibitory input terminals 75' and 77' of this neuron. In the circuit 50 of FIGURE 6a, all of these signals are applied to excitatory input terminals. Additionally, the second level neuron 72' is biased to conduct by the application of a bias signal $V_2$ through a unity gain resistor 79' to an excitatory input terminal 81' of the neuron 72'. In FIGURE 7b the transfer characteristic of the logic circuit 50' is illustrated. The logic circuit 50' is described by the following equation $$C = [1 - \tfrac{1}{2}A - \tfrac{1}{2}B - \tfrac{1}{2}(A-B) - \tfrac{1}{2}(B-A)] \quad (5)$$

When the input signals are binary signals, the logic circuit 50' provides the NOR function. The analog operation of the neural circuit 50' is obvious from the transfer function of FIGURE 7b. If the input signals A and B are assumed to be analog signals equal to .6 and .6, respectively, the output signal C is equal to .4. Physically, the output of the neurons 52' and 54' is zero with these inputs. The inhibitory input signals to the terminals 71' and 73' of the second level neuron 72' are one-half the input signals A and B or .3 and .3. The output C of the second level neuron 72' is therefore 1 minus the sum of these two inhibitory signals. This example illustrates the fact that electrical neurons add inhibitory signals together to reduce the output if the excitatory signals exceed the sum of the inhibitory signals.

Figure 8A:
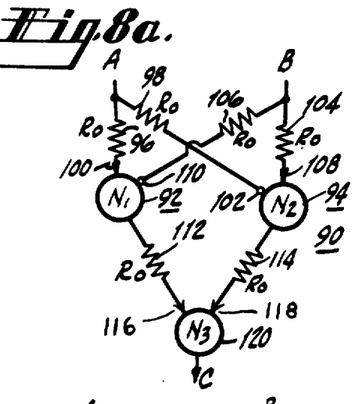

Referring now to FIGURE 8a, a neutral circuit 90 that performs the EXCLUSIVE OR function in Row 5 of Table I when binary input signals are applied thereto is illustrated. The neutral circuit 90 includes first level neurons 92 and 94. The input signal A is applied through unity gain resistors 96 and 98 to the excitatory input terminal 100 of the neuron 92 and the inhibitory input terminal 102 of the neuron 94, respectively. Similarly, the input signal B is applied through unity gain resistors 104 and 106 to the excitatory input terminal 108 of the neuron 94 and the inhibitory input terminal 110 of the neuron 92, respectively. The resultant difference signals from the neurons 92 and 94 are coupled through unity gain resistors 112 and 114 to excitatory input terminals 116 and 118, respectively, of a second level neuron 120.

The neural logic circuit 90 is described by the equation $$C = [(A-B) + (B-A)] \quad (6)$$

Figure 8B:
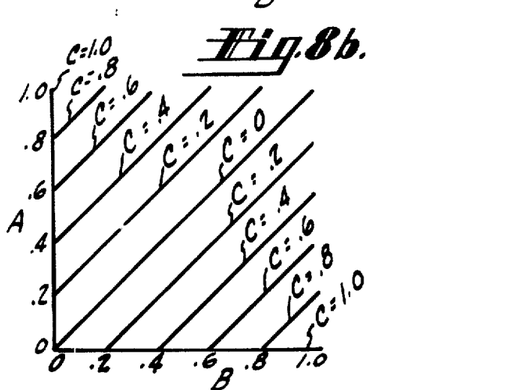

The transfer function of the neural circuit 90 is illustrated in FIGURE 8b.

When binary input signals are applied to the neural circuit 90, the circuit functions as an EXCLUSIVE OR gate. When analog input signals are applied to this circuit, the circuit 90 functions to measure the magnitude of the difference between the two signals. To illustrate this analog characteristic of the circuit 90, it is assumed that the input signal A is equal to .8 and the input signal B is equal to .2. The output of the first level neuron 92 under these circumstances is .6, whereas the output of the other first level neuron 94 is 0 due to the greater inhibitory than excitatory signal. The single .6 input signal to the second level neuron 120 also produces an output signal equal to .6 which is the magnitude of the difference between the two analog signals.

Figure 9A:
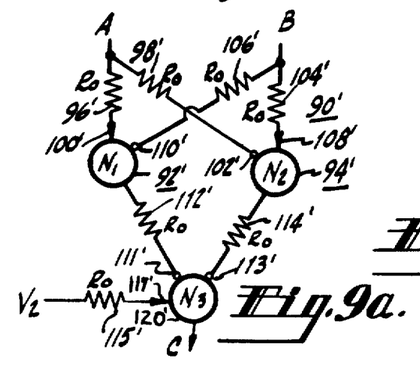
Figure 9B:
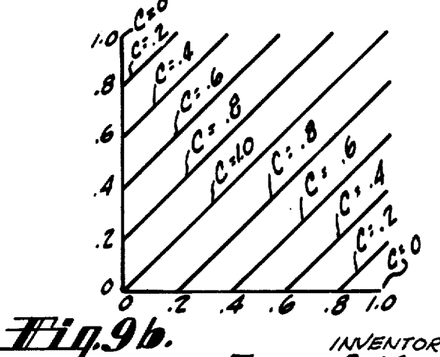

Referring now to FIGURE 9a, a neural circuit 90' provides the EXCLUSIVE NOR logic function shown in Row 6 of Table I. The components of the neural circuit 90' are given the same, but primed, reference numerals as the components in the neural circuit 90 because of their similarity. The differences between the two circuits are that the resultant signals from the first level neurons 92' and 94' in the circuit 90' are applied to inhibitory input terminals 111' and 113' of the second level neuron 120' and this neuron is also biased to normally conduct by a biasing signal $V_2$ applied through a unity gain resistor 115' to an excitatory input signal 117' thereof. The transfer function of the neural circuit 90' is shown in FIGURE 9b and the algebraic equation defining the output signal C of the circuit is $$C = [1 - (A-B) - (B-A)] \quad (7)$$

The neural circuit 90' provides the EXCLUSIVE NOR function when binary input signals are applied thereto. The EXCLUSIVE NOR function provides an output at the 1 level only when both the input signals are either 1 or 0. The circuit 90' is an equality circuit and produces an output signal C equal to the normalized value of 1 when any equal analog signals are applied to the network. This is apparent from the transfer function of FIGURE 9b wherein the highest output signal C is produced when the input signals A and B are equal and the output signal C decreases the more unequal A and B become.

Figure 10A:
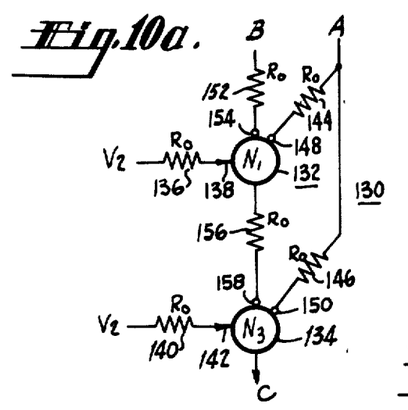

Referring now to FIGURE 10a, there is shown a neural circuit 130 that performs the binary logic function illustrated in Row 7 of Table I. The circuit 130 includes a first level neuron 132 and a second level neuron 134. Both of the neurons are normally biased to conduction by a biasing signal $V_2$ applied through a unity gain resistor 136 to an excitatory input terminal 138 of the neuron 132 and through a unity gain resistor 140 to an excitatory input terminal 142 of the neuron 134. An input signal A is applied through unity gain resistors 144 and 146 to inhibitory input terminals 148 and 150, respectively, of the neurons 132 and 134, respectively. An input signal B is applied through a unity gain resistor 152 to an inhibitory input terminal 154 of the neuron 132. The resultant output signal of the first level neuron 132 is coupled through a unity gain resistor 156 to an inhibitory input terminal 158 of the second level neuron 134. The transfer function of the circuit 130 is shown in FIGURE 10b and the circuit 130 provides an output signal in accordance with the limit algebra equation $$C = [1 - A - (1 - A - B)] \quad (8)$$

Figure 11:
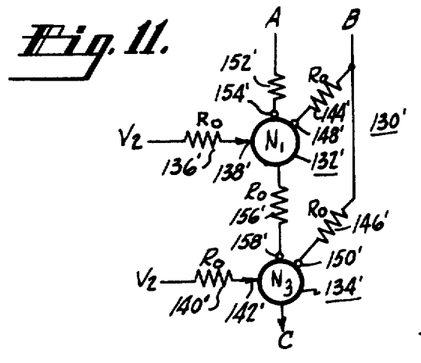

In FIGURE 11a, there is shown a physical exemplification of the logic function illustrated in Row 8, Column 5 of Table I. The neutral circuit 130' is identical to the neutral circuit 130 of FIGURE 10a with the input signals A and B interchanged. Consequently, the circuit 130' has been given the same reference numerals as the circuit 130 but the reference numerals are primed. The transfer function of the circuit 130' is shown in FIGURE 11b and the circuit 130' provides an output signal C in accordance with the equation $$C = [1 - B - (1 - A - B)] \quad (9)$$

Figure 10B:
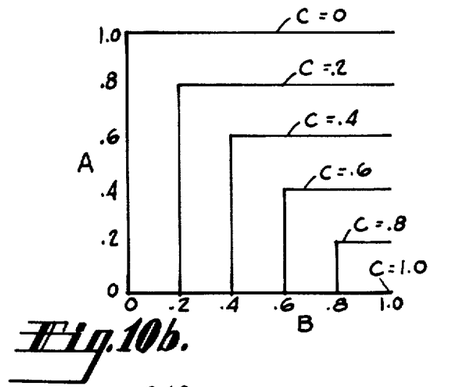
Figure 11B:
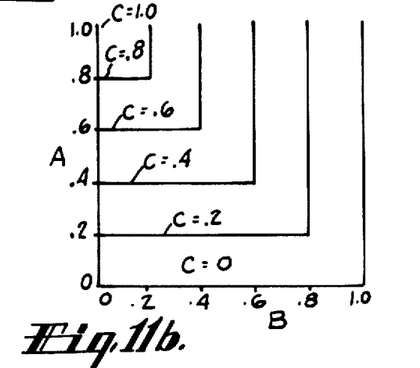

It is believed that the operation of the circuits 130 and 130' is apparent from the transfer functions of FIGURES 10b and 11b and the Equations (8) and (9).

Figure 12A:
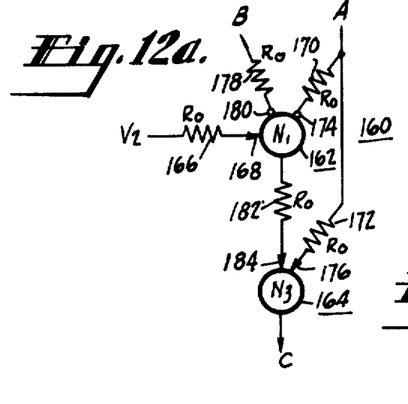
Figure 12B:
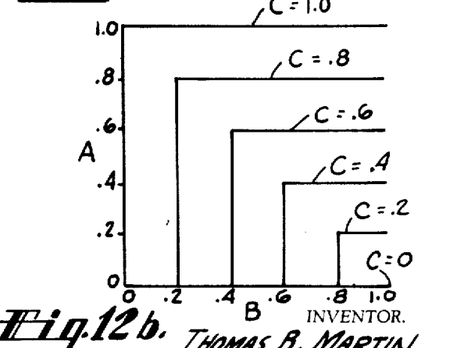

In FIGURE 12a there is shown a physical exemplification of the logic function illustrated in Row 9, Column 5 of Table I. The logic circuit 160 includes first and second level neurons 162 and 164, respectively. The first level neuron 162 is biased to normally conduct by a biasing signal $V_2$ applied through a unity gain resistor 166 to an excitatory input terminal 168 thereof. An input signal A is applied through unity gain resistors 170 and 172 to an inhibitory input terminal 174 of the first level neuron 162 and to an excitatory input terminal 176 of the second level neuron 164, respectively. An input signal B is applied through a unity gain resistor 178 to an inhibitory input terminal 180 of the first level neuron 162. The resultant signal from the first level neuron 162 is coupled through a unity gain resistor 182 to an excitatory input terminal 184 of the second level neuron 164. The transfer function of the neural circuit 160 is shown in FIGURE 12b and the circuit 160 produces an output signal C in accordance with the equation $$C=[A+(1-A-B)] \qquad (10)$$

Figure 13A:
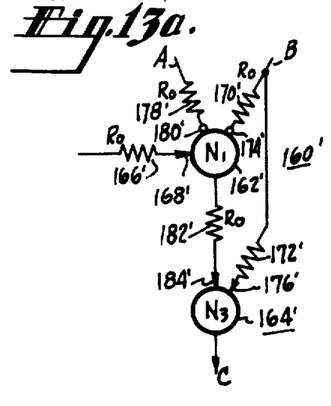
Figure 13B:
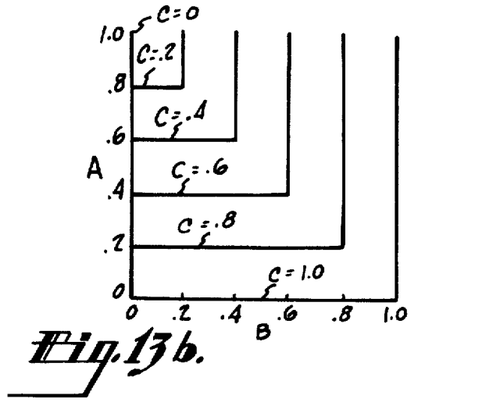

In FIGURE 13a there is shown a neural circuit 160' that is a physical exemplification of the logic function in Row 10, Column 5 of Table I. The circuit 160' is identical to the circuit 160 of FIGURE 12a except that the input signals A and B are interchanged. Consequently, the same but primed reference numerals are used for the circuit 160' as for the circuit 160. The transfer function of the circuit 160' is shown in FIGURE 13b and the circuit 160' provides an output signal C in accordance with the equation $$C=[B+(1-A-B)] \qquad (11)$$

It is believed that the operation of the neural circuits is apparent from the transfer functions 12b and 13b and the Equations (10) and (11). Neural circuits to perform the logic functions listed in Column 5 of Rows 11–16 are not given because of their obviousness.

Figure 14A:
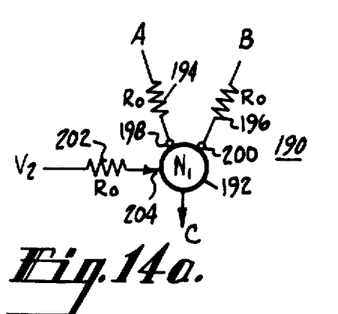
Figure 14B:
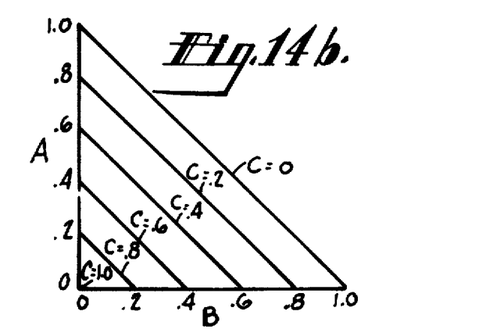

The neural circuits described are the preferred circuits to provide both digital and analog characteristics desired. However, these circuits are not the only ones that may be utilized to provide certain of these characteristics. In FIGURE 14a there is shown a neural NOR gate circuit 190 that includes a single neuron 192 having A and B input signals applied through unity gain resistors 194 and 196, respectively, to the inhibitory input terminals 198 and 200 thereof. The neuron 192 is biased to normally conduct by applying an energizing signal $V_2$ through a unity gain resistor 202 to an excitatory input terminal 204. The transfer function of the circuit 190 is shown in FIGURE 14b and the circuit 190 provides an output signal C in accordance with the equation $$C=[1-A-B] \qquad (12)$$

It is apparent that the circuit 190 provides the NOR function for binary signals because the output signal C is 0 except with both input signals are 0.

Figure 15A:
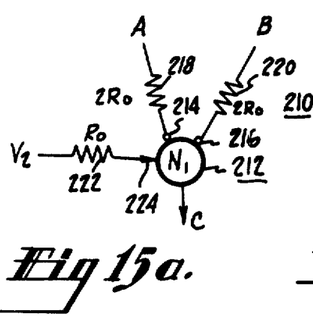

In FIGURE 15a there is shown a neural NAND gate circuit 210 that includes a neuron 212 having input signals A and B applied to inhibitory input terminals 214 and 216, respectively, through resistors 218 and 220. The resistors 218 and 220 are double the value of unity gain resistors to effectively halve the effect of the input signals A and B on the output signal C. The neuron 212 is biased to conduct normally by the application of an energizing voltage $V_2$ through a unity gain resistor 222 to an excitatory input terminal 224. The transfer function of the neural circuit 210 is shown in FIGURE 15b and the circuit produces an output signal C in accordance with the equation $$C=[1-\tfrac{1}{2}A-\tfrac{1}{2}B] \qquad (13)$$

Figure 15B:
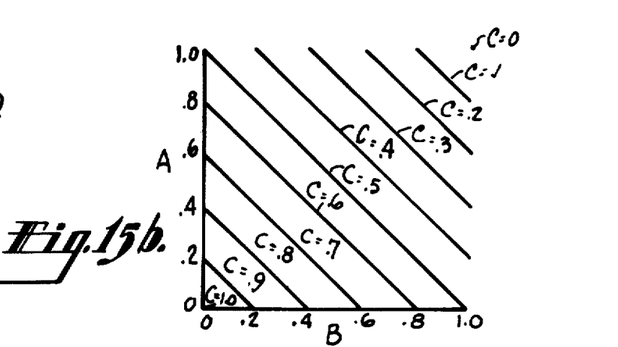

It is apparent from Equation (13) and the transfer function in FIGURE 15b that for binary input signals the circuit 210 produces an output signal equal to 0 only when both input signals A and B are equal to a binary 1. Thus, the NAND function is performed.

Figure 16A:
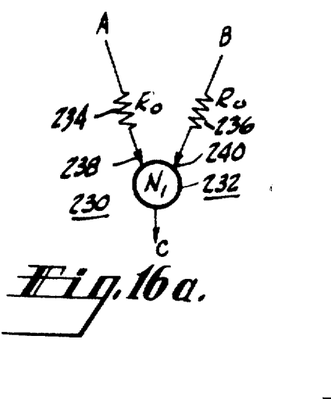

In FIGURE 16a there is shown a neural OR gate circuit 230 that includes a single neuron 232 having input signals A and B applied through unity gain resistors 234 and 236, respectively, to excitatory input terminals 238 and 240. The transfer function of the circuit 230 is shown in FIGURE 16b and the circuit 230 produces an output signal C in accordance with the equation $$C=[A+B] \qquad (14)$$

Figure 16B:
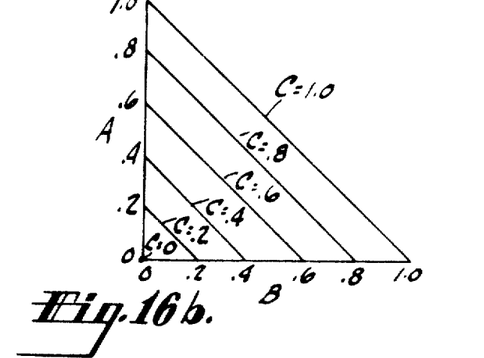

It is apparent from Equation (14) and the transfer function of FIGURE 16b that the circuit 230 produces an output signal C equal to a binary 1 when either or both the input signals A and B are equal to a binary 1.

Figure 17A:
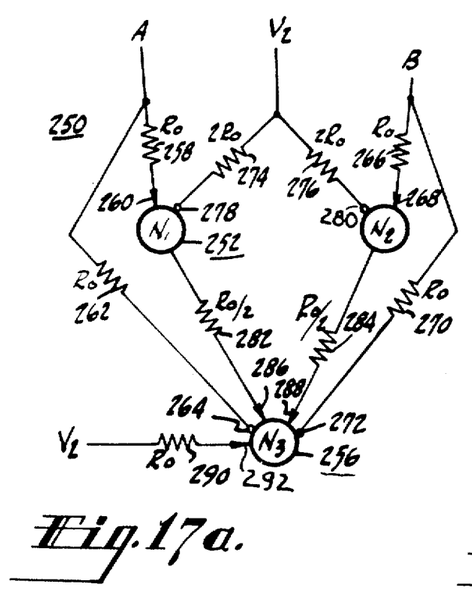
Figure 17B:
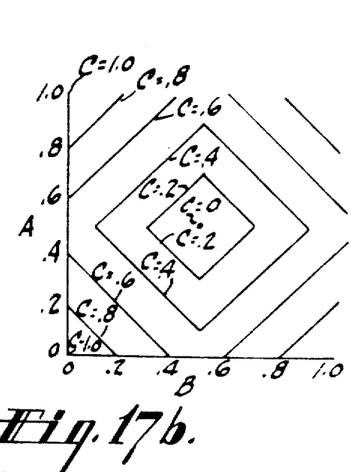

Neural circuits are also capable of easily performing certain analog functions that are only done with great difficulty, if done at all, by digital gates. In FIGURE 17a there is illustrated one such neural circuit. The neural circuit 250 provides a minimum output signal C whenever a pair of input signals A and B are each equal to a predetermined value. The output signal C increases as each input signal deviates from the predetermined value. Due to the contour of the transfer function shown in FIGURE 17b, the circuit 250 is termed a valley response or valley network. The nadir point (i.e., $C=0$) in the valley in the circuit 250 is selected to be at the point wherein both A and B equal $.5V_2$.

The circuit 250 includes a pair of first level neurons 252 and 254 and a second level neuron 256. An input signal A is applied through a unity gain resistor 258 to an excitatory input terminal 260 of the first level neuron 252 and through another unity gain resistor 262 to an inhibitory input terminal 264 of the second level neuron 256. Similarly, the input signal B is applied through a unity gain resistor 266 to an excitatory input terminal 268 of the neuron 254 and through a unity gain resistor 270 to an inhibitory input terminal 272 of the second level neuron 256. An inhibiting signal $V_2$ is applied through resistors 274 and 276 to inhibitory input terminals 278 and 280, respectively, of the first level neurons 252 and 254. The resistors 274 and 276 are double the value of unity gain resistors so as to halve the effect of the bias inhibiting signal $V_2$ on output signals of the neurons 252 and 254 when the excitatory inputs to these neurons exceed the inhibitory inputs thereto. The resultant signals from the first level neurons 252 and 254 are applied through resistors 282 and 284, respectively, to excitatory input terminals 286 and 288, respectively, of the second level neuron 256. The resistors 282 and 284 are one-half the value of unity gain resistors and consequently double the effect of the resultant signals on output signal C of the neuron network 250. The second level neuron 256 is also biased by the energized signal $V_2$ by applying this signal through a unity gain resistor 290 to an excitatory input terminal 292 thereof. The output signal C is defined by the equation $$C=[1-A-B+2(B-\tfrac{1}{2})+2(A-\tfrac{1}{2})] \qquad (15)$$

The neural circuit 250 provides a null or valley response in the output signal C when the two input signals equal $.5V_2$. A nadir position other than $.5V_2$ can be simply selected by altering the values of the resistors 274 and 276. For example, by selecting these resistors to be $4R_0$, the nadir position in the valley response is equal to $.25V_2$.

In operation, a pair of input signals A and B of normalized values .6 and .4, respectively, will be assumed to be applied to the circuit 250. The neuron 252 produces a resultant signal equal to .6 minus .5 or .1 because the result of the inhibitory signal $V_2$ on the neuron 252 is halved by the weighting resistor 274. The neuron 254 produces no resultant signal because the inhibitory signal due to the biasing of this neuron exceeds the excitatory input signal B. The second level neuron 256 effectively subtracts the inhibitory input signals A and B from the excitatory bias signal $V_2$ to cancel out this bias signal. Consequently, the output signal C is effectively determined by the resultant signal from the neuron 252. The resultant signal of $.1V_2$ from the neuron 252 produces an output signal C of $.2V_2$ from the neuron 256 due to the weighting resistor 282 being one-half of a unity gain resistor. The output signal $C=.2$ may also be quickly read from the transfer function of FIGURE 17b.

It is to be noted that due to the temporal characteristics of electrical neurons as described in the copending application referred to above, the input signals A and B of any neuron need not be applied simultaneously. Due to the time constant incorporated in the preferred embodiment of the neuron, the input signals A and B may be serial rather than overlapping.

Thus, in accordance with the invention, a plurality of neural circuits are described which provide all of the sixteen logic functions when a pair of digital input signals are applied to these neurons. However, when analog signals intermediate the binary levels are applied to the neurons, a variety of responses not obtainable in digital networks is provided.

What is claimed is:

1. A logic circuit for processing signals comprising in combination,
    a pulseless electrical neuron having an input terminal for receiving D-C input signals and an output terminal for providing D-C output signals,
    said electrical neuron exhibiting a D-C input-output transfer characteristic including a substantially linear portion having a slope of predetermined value,
    a weighting resistor coupled to said input terminal of said electrical neuron,
    means for applying to said weighting resistor a D-C input signal of an amplitude to cause said electrical neuron to operate in the substantially linear portion of said D-C input-output transfer characteristic, and
    means for deriving from said output terminal a D-C output signal exhibiting
        (1) an amplitude that is a multiple $x$ of said amplitude of said D-C input signal for a weighting resistor selected to have a resistance that is the submultiple $1/x$ of said predetermined value of said slope, and
        (2) an amplitude that is a submultiple $1/y$ of said given amplitude of said input signal for a weighting resistor selected to have a resistance that is the multiple $y$ of said predetermined value of said slope.

2. A circuit in accordance with claim 1 that further includes
    a plurality of said weighting resistors,
    a plurality of said electrical neurons,
    means including said weighting resistors for interconnecting said electrical neurons into first and second levels,
    means for applying said input signals to said first level of neurons, and
    means for deriving an output signal from said second level of neurons.

3. A circuit in accordance with claim 2 that further includes means for applying a biasing signal through one of said weighting resistors to an electrical neuron in said second level.

4. A circuit in accordance with claim 2 wherein said weighting resistors for applying input signals to said first level of neurons comprise resistors that are equal in value to said predetermined value of said slope.

5. A circuit in accordance with claim 4 wherein said weighting resistors interconnecting said first level neurons to said second level neurons comprise weighting resistors that are equal in value to said predetermined value of said slope.

6. A circuit in accordance with claim 4 wherein said weighting resistors interconnecting said first level neurons to said second level neurons comprise weighting resistors that are a multiple greater than one of said predetermined value of said slope.

7. A circuit in accordance with claim 4 wherein said weighting resistors interconnecting said first level neurons to said second level neurons comprise weighting resistors that are a submultiple of said predetermined value of said slope.

8. A circuit in accordance with claim 2 wherein said electrical neurons each include excitatory signal input terminals for exciting said neuron into an active state and inhibitory signal input terminals for inhibiting the activation of said neuron,
    means for applying input signals through said weighting resistors to electrical neurons in said first level to produce resultant sum and difference signals, and
    means for applying said resultant signals to a neuron in said second level to produce an output signal indicative of the logic operation performed by said first and second level neurons.

9. A neuron logic circuit in accordance with claim 8 that further includes
    means for applying said input signals to said second level neuron along with said resultant signals.

10. A neuron logic circuit in accordance with claim 9 that further includes means for applying a fixed bias signal to a neuron in said second level.

References Cited

UNITED STATES PATENTS

| | | | |
|---|---|---|---|
| 3,097,349 | 7/1963 | Putzrath et al. | 340—172.5 |
| 3,238,504 | 3/1966 | Crane | 340—172.5 |
| 3,310,784 | 3/1967 | Hilinski | 340—172.5 |
| 3,327,291 | 6/1967 | Lee | 340—172.5 |

PAUL J. HENON, *Primary Examiner.*

R. RICKERT, *Assistant Examiner.*